(12) United States Patent
Takagi et al.

(10) Patent No.: US 6,447,696 B1
(45) Date of Patent: Sep. 10, 2002

(54) GRAFTED POLYMER AND ITS PRODUCTION PROCESS AND USE

(75) Inventors: Masahito Takagi, Ibaraki; Shigeru Yamaguchi, Yao, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 133 days.

(21) Appl. No.: 09/618,276

(22) Filed: Jul. 18, 2000

(30) Foreign Application Priority Data

Jul. 30, 1999 (JP) .......................................... 11-218230

(51) Int. Cl.$^7$ ................................................. C02F 5/12
(52) U.S. Cl. ........................ 252/180; 528/403; 525/404; 548/543; 510/276
(58) Field of Search ........................ 528/403; 525/404; 548/543; 510/276; 252/180

(56) References Cited

U.S. PATENT DOCUMENTS

| | | | |
|---|---|---|---|
| 4,048,301 A | * | 9/1977 | Papantoniou |
| 4,904,408 A | * | 2/1990 | Kud et al. |
| 4,960,465 A | * | 10/1990 | Arfaei |

FOREIGN PATENT DOCUMENTS

| | | |
|---|---|---|
| JP | 50109297 | 8/1975 |
| JP | 51144741 | 12/1976 |
| JP | 51144742 | 12/1976 |
| JP | 63260995 | 10/1988 |

OTHER PUBLICATIONS

Mark, Encyclopedia of Polymer Science and Engineering, Wiley–Interscience, vol. 6, pp. 234–237 (1986).*

* cited by examiner

Primary Examiner—Robert Dawson
Assistant Examiner—Kuo-Liang Peng
(74) Attorney, Agent, or Firm—Roylance, Abrams, Berdo & Goodman, L.L.P.

(57) ABSTRACT

The present invention provides: a novel grafted polymer which has good hydrophilicity and is excellent in the adsorbency and the dispersibility; and a scale inhibitor and a detergent additive, both of which involve the use of this grafted polymer. The grafted polymer is obtained by a production process comprising the steps of: polymerizing an alkylene oxide component with an ethylene oxide content of at least 50 mol % to obtain a polyether compound (A) having a number-average molecular weight of not lower than 200; and graft-polymerizing a graft component (B) onto the resultant polyether compound (A) in a specific ratio, wherein the graft component (B) includes N-vinylpyrrolidone (b1) as an essential component and might further include a monoethylenically unsaturated monomer (b2), wherein when the monomer (b2) includes a carboxyl-group-containing monoethylenically unsaturated monomer (b2-1) including a monomer having a structure formable into a carboxylic acid (or salt) by hydrolysis, the resultant polymer is hydrolyzed such that not less than 50 mol % of all structural units as derived from the monomer (b2-1) can have a carboxyl group. The resultant grafted polymer is used for the scale inhibitor and the detergent additive.

7 Claims, No Drawings

GRAFTED POLYMER AND ITS PRODUCTION PROCESS AND USE

BACKGROUND OF THE INVENTION

A. Technical Field

The present invention relates to a novel grafted polymer which is favorable as a scale inhibitor or detergent additive.

B. Background Art

It is generally considered that a scale inhibitor inhibits the formation of scale such as calcium carbonate in water by adsorbing and dispersing crystal nuclei of the scale (threshold effects). However, for sufficiently exhibiting such effects in water, it is important that the scale inhibitor has good hydrophilicity along with the adsorbency and the dispersibility.

On the other hand, in recent years, as laundry detergents become more and more compact, they generally contain not only surfactants, but also synthetic polymers such as acrylic acid polymers and acrylic acid/maleic acid copolymers as detergent additives. However, in the present circumstances, such conventional synthetic polymers cannot inhibit the migration of dyes from dyed cloth to other cloth which occurs in the processes of washing and rinsing.

In uses for such as scale inhibitors and detergent additives, conventionally, polymers obtained by polymerizing unsaturated carboxylic monomers such as acrylic acid or copolymers of these monomers with other monomers are widely used because of their properties such as chelatability and dispersibility. In addition, grafted polymers obtained by graft-polymerizing unsaturated carboxylic monomers (e.g. acrylic acid), vinyl acetate, or (meth)acrylate esters onto polyether compounds are used because of their properties such as dispersibility and solubility.

In addition, attempts are also made to graft-polymerize N-vinylpyrrolidone to further improve the above grafted polymers. For example, in JP-A-260995/1988 there is reported a grafted polymer as a graying inhibitor for laundry obtained by graft-polymerizing, in a specific ratio, (b) N-vinylpyrrolidone and (c) at least one vinyl ester, as derived from a saturated monocarboxylic acid with 1~6 carbon atoms, and/or a methyl or ethyl ester of acrylic or methacrylic acid onto (a) a poly(alkylene oxide) based on ethylene oxide, propylene oxide, or butylene oxide. However, this grafted polymer merely exhibits low hydrophilicity, because the ratio of the poly(alkylene oxide) (a) (which is the base of grafting) to the graft components (b) and (c) is low, and because only up to 15 mol % of the whole ester (c) is hydrolyzed.

SUMMARY OF THE INVENTION

A. Object of the Invention

An object of the present invention is to provide: a novel grafted polymer which has good hydrophilicity and is excellent in the adsorbency and the dispersibility; and a scale inhibitor and a detergent additive, both of which involve the use of this grafted polymer.

B. Disclosure of the Invention

The present inventors diligently studied to solve the above problems. As a result, they completed the present invention by finding that if an oxyethylene chain and a pyrrolidone group were allowed to coexist and if the ratio of the oxyethylene chain which was the base of grafting was set at not smaller than a certain quantity, then good hydrophilicity could be retained, and the dispersibility and the adsorbency could be enhanced.

That is to say, a grafted polymer, according to the present invention, is a product by a process including the step of graft-polymerizing a graft component (B) onto a polyether compound (A) in a ratio such that the graft component (B) is in the range of 0.1~1.2 weight parts per 1 weight part of the polyether compound (A), wherein the polyether compound (A) is a product by a process including the step of polymerizing an alkylene oxide component with an ethylene oxide content of at least 50 mol % and has a number-average molecular weight of not lower than 200, and wherein the graft component (B) includes N-vinylpyrrolidone (b1) as an essential component and might further include a monoethylenically unsaturated monomer (b2), wherein the monomer (b2) includes a carboxyl-group-containing monoethylenically unsaturated monomer (b2-1) and/or a cationic monoethylenically unsaturated monomer (b2-2), with the proviso that the monomer (b2-1) may be a monomer having a structure formable into a carboxylic acid (or salt) by hydrolysis, wherein when the monomer (b2-1) includes the monomer having the structure formable into a carboxylic acid (or salt) by hydrolysis, not less than 50 mol % of all structural units as derived from the monomer (b2-1) have a carboxyl group, inclusive of a carboxyl group formable by the hydrolysis of the monomer having the above structure, with the proviso that when the carboxylic salt is formed by the hydrolysis, this carboxylic salt is also taken as the carboxyl group.

A production process for a grafted polymer, according to the present invention, comprises the steps of: polymerizing an alkylene oxide component with an ethylene oxide content of at least 50 mol % to obtain a polyether compound (A) having a number-average molecular weight of not lower than 200; and graft-polymerizing a graft component (B) onto the resultant polyether compound (A) in a ratio such that the graft component (B) is in the range of 0.1~1.2 weight parts per 1 weight part of the polyether compound (A), wherein the graft component (B) includes N-vinylpyrrolidone (b1) as an essential component and might further include a monoethylenically unsaturated monomer (b2), wherein the monomer (b2) includes a carboxyl-group-containing monoethylenically unsaturated monomer (b2-1) and/or a cationic monoethylenically unsaturated monomer (b2-2), with the proviso that the monomer (b2-1) may be a monomer having a structure formable into a carboxylic acid (or salt) by hydrolysis, and this production process further comprises the step of hydrolyzing the resultant grafted polymer when the monomer (b2-1) includes the monomer having the structure formable into a carboxylic acid (or salt) by hydrolysis, wherein the hydrolyzing step is carried out such that not less than 50 mol % of all structural units as derived from the monomer (b2-1) can have a carboxyl group, inclusive of a carboxyl group formable by the hydrolysis of the monomer having the above structure, with the proviso that when the carboxylic salt is formed by the hydrolysis, this carboxylic salt is also taken as the carboxyl group.

A scale inhibitor, according to the present invention, comprises the above grafted polymer according to the present invention as an essential component.

A detergent additive, according to the present invention, comprises the above grafted polymer according to the present invention as an essential component.

These and other objects and the advantages of the present invention will be more fully apparent from the following detailed disclosure.

DETAILED DESCRIPTION OF THE INVENTION

The grafted polymer, according to the present invention, is a product by a process including the step of graft-polymerizing a graft component (B) onto a polyether compound (A), wherein the polyether compound (A) is a product by a process including the step of polymerizing an alkylene oxide component including ethylene oxide.

In the present invention, it is important that the graft polymerization is carried out in a ratio such that the graft component (B) is in the range of 0.1~1.2 weight parts per 1 weight part of the polyether compound (A). In the case where the ratio of the graft component (B) is smaller than 0.1 weight parts per 1 weight part of the polyether compound (A), the amount of N-vinylpyrrolidone (b1) which is included as an essential component in the graft component (B) is too small, therefore adsorption effects by the pyrrolidone group cannot sufficiently be exhibited. On the other hand, in the case where the ratio of the graft component (B) is larger than 1.2 weight parts per 1 weight part of the polyether compound (A), the ratio of the polyether compound (A) is so small that the dispersibility or hydrophilicity of the oxyethylene chain cannot sufficiently be exhibited, and further, the number of the graft sites is so small that the graft polymerization reaction itself is difficult to run. Incidentally, when the below-mentioned graft component (B) further includes a monoethylenically unsaturated monomer (b2) besides the N-vinylpyrrolidone (b1), the total of the weight parts of the N-vinylpyrrolidone (b1) and the weight parts of the monoethylenically unsaturated monomer (b2) is taken as the weight parts of the graft component (B).

The polyether compound (A), as used in the present invention, is a product by a process including the step of polymerizing an alkylene oxide component which includes ethylene oxide as an essential component and, if necessary, further includes another alkylene oxide, but the above alkylene oxide component must have an ethylene oxide content of at least 50 mol %, preferably at least 70 mol %. In the case where the ethylene oxide content is lower than 50 mol %, the hydrophilicity of the resultant grafted polymer is so low that the dispersibility cannot sufficiently be exhibited.

The above other alkylene oxide, which is further included in the alkylene oxide component if necessary, is not especially limited if it is an ether copolymerizable with ethylene oxide. Specific examples thereof include propylene oxide, styrene oxide, epichlorohydrin, allyl glycidyl ether, and phenyl glycidyl ether. These alkylene oxides may be used either alone respectively or in combinations with each other.

The polyether compound (A), as used in the present invention, must have a number-average molecular weight of not lower than 200. The upper limit of the number-average molecular weight of the polyether compound (A) is not especially limited, but is preferably 100,000. In the case where the number-average molecular weight of the polyether compound (A) is lower than 200, the molecular weight of the resultant grafted polymer might be so low that the dispersibility might not sufficiently be exhibited. On the other hand, in the case where the number-average molecular weight of the polyether compound (A) is higher than 100,000, there are disadvantages in that the viscosity tends to be so high that the polyether compound (A) is difficult to handle when the graft polymerization is carried out.

The N-vinylpyrrolidone (b1) is indispensable to the graft component (B) as used in the present invention. If the pyrrolidone group is allowed to exist in the grafted polymer, then excellent dispersibility and adsorbency can be given. For example, when the resultant grafted polymer is used for a scale inhibitor, the occurrence of scale can effectively be inhibited and, when the resultant grafted polymer is used for a detergent additive, dyes as eluted from fibers into water can be adsorbed and dispersed to inhibit the dyes from migrating to other fibers.

The graft component (B), as used in the present invention, can optionally include the monoethylenically unsaturated monomer (b2) besides the N-vinylpyrrolidone (b1), because more excellent dispersibility can be given by allowing the monoethylenically unsaturated monomer (b2) to exist in the grafted polymer. Specifically, the monoethylenically unsaturated monomer (b2) includes a carboxyl-group-containing monoethylenically unsaturated monomer (b2-1) and/or a cationic monoethylenically unsaturated monomer (b2-2), where the monomer (b2-1) is a monomer having a structure formable into a carboxylic acid (or salt) by hydrolysis. These monoethylenically unsaturated monomers (b2) can optionally be used either alone respectively or in combinations with each other.

When the graft component (B) further includes the monoethylenically unsaturated monomer (b2), the weight ratio between the N-vinylpyrrolidone (b1) and the monoethylenically unsaturated monomer (b2) is such that the monoethylenically unsaturated monomer (b2) is preferably in the range of 0~5 weight parts, more preferably in the range of 0~3 weight parts, per 1 weight part of the N-vinylpyrrolidone (b1). In the case where the ratio of the monoethylenically unsaturated monomer (b2) is higher than this range, there are disadvantages in that the content of N-vinylpyrrolidone (b1) is so low that the adsorption effects by the pyrrolidone group cannot sufficiently be exhibited.

Specific examples of the above carboxyl-group-containing monoethylenically unsaturated monomer (b2-1) include acrylic acid, methyl acrylate, ethyl acrylate, butyl acrylate, methacrylic acid, methyl methacrylate, ethyl methacrylate, butyl methacrylate, maleic acid, dimethyl maleate, diethyl maleate, dibutyl maleate, maleic anhydride, fumaric acid, dimethyl fumarate, diethyl fumarate, and dibutyl fumarate. Among them, particularly, acrylic acid, esters thereof, maleic acid, and maleic anhydride are preferable. These may be used either alone respectively or in combinations with each other.

When the above carboxyl-group-containing monoethylenically unsaturated monomer (b2-1) includes the monomer having the structure formable into a carboxylic acid (or salt) by hydrolysis, not less than 50 mol % of all structural units as derived from the monomer (b2-1) need to have a carboxyl group, inclusive of a carboxyl group formable by the hydrolysis of the monomer having the above structure, with the proviso that, as to the carboxyl group formable by the hydrolysis of the monomer having the above structure, the carboxylic salt as formed by this hydrolysis is also taken as the carboxyl group. Preferably not less than 60 mol % of all structural units as derived from the monomer (b2-1), more preferably all these structural units, have a carboxyl group. If not less than 50 mol % of all structural units as derived from the carboxyl-group-containing monoethylenically unsaturated monomer (b2-1) are allowed to have a carboxyl group, then it is possible to make the resultant grafted polymer retain excellent hydrophilicity. When a monomer (x) having a carboxyl group and the monomer (y) having the structure formable into a carboxylic acid (or salt) by hydrolysis (e.g. esters) are jointly used as the carboxyl-group-containing monoethylenically unsaturated monomer (b2-1), for example, if the ratio of the monomer (x) having a carboxyl group is not lower than 50 mol % of the above monomer (b2-1), then the hydrolysis of the monomer (y) (e.g. esters) does not need to be carried out.

The conversion into the carboxylic acid (or salt) by the above hydrolysis, for example, may be carried out by alkali hydrolysis in water. Specifically, water is added to the polymer (resultant from the below-mentioned graft polymerization) to form an aqueous solution or slurry, and thereto an alkali is added and, if necessary, the resultant mixture is heated. The alkali is not especially limited, but sodium hydroxide is preferable. Incidentally, an alcohol as formed by the hydrolysis may be left as it is, but the alcohol may be removed by heating or vacuuming. In addition, the carboxylic acid (or salt) as converted by the hydrolysis may be either in the form of a carboxylic acid or a salt of the carboxylic acid.

The cationic monoethylenically unsaturated monomer (b2-2) is not especially limited, but specific examples thereof include N-vinylimidazole, 2-vinylpyridine, and 4-vinylpyridine. In addition, the cationic monoethylenically unsaturated monomer (b2-2) may be a product by a process including the step of quaternizing the amino group of these compounds with conventional quaternizing agents such as methyl chloride, dimethyl sulfate, diethyl sulfate, and benzyl chloride. In addition, the quaternization may be carried out after the polymerization.

In the production process for a grafted polymer, according to the present invention, first, the alkylene oxide component including ethylene oxide is polymerized to obtain the polyether compound (A), and then the aforementioned graft component (B) is graft-polymerized onto the resultant polyether compound (A) in the presence of a polymerization initiator.

The above polyether compound (A) is, for example, obtained by a process including the step of polymerizing the above alkylene oxide component including ethylene oxide as an essential component by conventional methods in the presence of a reactive compound which is to be a polymerization-initiating site.

The above reactive compound, as used to obtain the polyether compound (A), is not especially limited if it is a compound to be a site for initiating the polymerization of the cyclic ether. Specific examples thereof include water, alcohols, hydrogen halides, ammonia, amines, hydroxylamines, and carboxylic acids. Among them, particularly, water, alcohols, and amines are preferable. More specifically, examples of the alcohols include: primary aliphatic alcohols with 1~22 carbon atoms, such as methanol, ethanol, n-propanol, and n-butanol; aromatic alcohols such as phenol, isopropylphenol, octylphenol, tert-butylphenol, nonylphenol, and naphthol; secondary alcohols with 3~18 carbon atoms, such as isopropyl alcohol and alcohols obtained by a process including the step of oxidizing n-paraffins; tertiary alcohols such as tert-butanol; diols such as ethylene glycol, diethylene glycol, propanediol, butanediol, and propylene glycol; triols such as glycerol and trimethylolpropane; and polyols such as sorbitol. In addition, examples of the amines include ethylenediamine and polyethylenimine. These exemplified compounds, which are used as the reactive compound, may be used either alone respectively or in combinations with each other.

The polymerization method to obtain the polyether compound (A) is not especially limited, but may fitly be selected from among the following: 1) anionic polymerization involving the use of basic catalysts such as strong alkalis (e.g. hydroxides and alcoholates of alkaline metals) and alkylamines; 2) cationic polymerization involving the use of catalysts such as metal halides, semi-metal halides, mineral acids, and acetic acid; and 3) coordination polymerization involving the use of combinations of alkoxides of metals (e.g. aluminum, iron, zinc), alkaline earth compounds, and Lewis acids.

The polyether compound (A), as used in the present invention, may be either a polyether as directly obtained by a process including the step of polymerizing the aforementioned alkylene oxide component by the aforementioned polymerization method, or a derivative from this polyether. Examples of such a derivative include crosslinked products obtained by a process including the step of allowing the polyether to react with a crosslinking agent having a plurality of groups, such as carboxyl group, isocyanate group, amino group, and halogen group.

The polymerization initiator, as used in the graft polymerization step, is not especially limited, but organic peroxides are preferable. Specific examples of the organic peroxide include: ketone peroxides such as methyl ethyl ketone peroxide, cyclohexanone peroxide, 3,3,5-trimethylcyclohexanone peroxide, methylcyclohexanone peroxide, methylacetoacetate peroxide, and acetylacetone peroxide; hydroperoxides such as tert-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, and 2-(4-methylcyclohexyl)propane hydroperoxide; dialkyl peroxides such as di-tert-butyl peroxide, tert-butyl cumyl peroxide, dicumyl peroxide, α,α'-bis(tert-butylperoxy)-p-diisopropylbenzene, α,α'-bis(tert-butylperoxy)-p-isopropylhexyne, 2,5-dimethyl-2,5-di(tert-butylperoxy) hexane, and 2,5-dimethyl-2,5-di(tert-butylperoxy)hexyne-3; peroxyesters such as tert-butyl peroxyacetate, tert-butyl peroxylaurate, tert-butyl peroxybenzoate, di-tert-butyl peroxyisophthalate, 2,5-dimethyl-2,5-di(benzoylperoxy) hexane, tert-butyl peroxyisopropyl carbonate, tert-butyl peroxyisobutyrate, tert-butyl peroxypivalate, tert-butyl peroxyneodecanoate, cumyl peroxyneodecanoate, tert-butyl peroxy-2-ethylhexanoate, tert-butyl peroxy-3,5,5-trimethylcyclohexanoate, tert-butyl peroxybenzoate, tert-butyl peroxymaleate, cumyl peroxyoctoate, tert-hexyl peroxypivalate, tert-hexyl peroxyneohexanoate, and cumyl peroxyneohexanoate; peroxyketals such as n-butyl-4,4-bis (tert-butylperoxy)valerate, 2,2-bis(tertbutylperoxy)butane, 1,1-bis(tert-butylperoxy)-3,3,5-trimethylcyclohexane, 1,1-bis(tert-butylperoxy)cyclohexane, and 2,2-bis(tert-butylperoxy)octane; diacyl peroxides such as acetyl peroxide, isobutyryl peroxide, octanoyl peroxide, decanoyl peroxide, lauroyl peroxide, 3,3,5-trimethylcyclohexanoyl peroxide, succinic acid peroxide, benzoyl peroxide, 2,4-dichlorobenzoyl peroxide, and m-toluyl peroxide; peroxydicarbonates such as di-isopropyl peroxydicarbonate, di-2-ethylhexyl peroxydicarbonate, di-n-propyl peroxydicarbonate, bis-(4-tert-butylcyclohexyl) peroxydicarbonate, dimyristyl peroxydicarbonate, dimethoxyisopropyl peroxydicarbonate, di(3-methyl-3-methoxybutyl) peroxydicarbonate, and diallyl peroxydicarbonate; and other organic peroxides such as acetylcyclohexylsulfonyl peroxide and tert-butyl peroxyallyl carbonate. These exemplified compounds, which are used as the polymerization initiator, may be used either alone respectively or in combinations with each other.

The amount of the above polymerization initiator used is not especially limited, but is preferably in the range of 0.1~30 weight %, more preferably 0.5~20 weight %, of the graft component (B). In the case where the amount of the polymerization initiator is smaller than 0.1 weight %, the ratio of grafting onto the polyether compound (A) tends to be low. On the other hand, in the case where the amount of the polymerization initiator is larger than 30 weight %, for example, there are economical disadvantages in that when the above-exemplified organic peroxide is used as the polymerization initiator, this organic peroxide is expensive.

The method for adding the above polymerization initiator is not especially limited. For example, the polymerization initiator may beforehand be added to the polyether compound (A) and/or each graft component (B) before the graft polymerization step, or may be added not beforehand, but simultaneously with the addition of each graft component (B) in the graft polymerization step. Preferable is the latter method, namely, the method in which the polymerization initiator may be added simultaneously with the addition of each graft component (B) in the graft polymerization step.

The solvent which is usable in the graft polymerization step is not especially limited, but a preferable one is such that the constant of chain transfer of the raw monomer to the solvent is as small as possible. Specific examples of such a solvent include: alcohols such as isobutyl alcohol, n-butyl alcohol, tert-butyl alcohol, ethylene glycol, diethylene glycol, triethylene glycol, propylene glycol, ethylene glycol monoalkyl ethers, and propylene glycol monoalkyl ethers; diethers such as ethylene glycol dialkyl ethers and propylene glycol dialkyl ethers; and acetic compounds such as ethyl acetate, propyl acetate, butyl acetate, acetic acid esters of ethylene glycol monoalkyl ethers, and acetic acid esters of propylene glycol monoalkyl ethers. These exemplified compounds may be used either alone respectively or in combinations with each other. Examples of the alkyl group in the alcohols and the diethers among the above-exemplified compounds include methyl, ethyl, propyl, and butyl.

The amount of the solvent which is usable in the graft polymerization step is not especially limited, but is preferably not larger than 20 weight % of the whole reaction system, and it is more preferable to use substantially no solvent. In the case where the amount of the solvent is larger than 20 weight % of the whole reaction system, there are disadvantages in that the graft ratio of each graft component (B) might be low.

The reaction temperature in the graft polymerization step is not especially limited, but is preferably not lower than 80° C., more preferably in the range of 90~160° C. In the case where the reaction temperature is lower than 80° C., the graft polymerization is so difficult to run that the ratio of grafting onto the polyether compound (A) tends to be low. On the other hand, in the case where the reaction temperature is higher than 160° C., there are disadvantages in that the polyether compound (A) and the resultant grafted polymer might pyrolyze.

The grafted polymer according to the present invention has good hydrophilicity and is excellent in the adsorbency and the dispersibility, therefore this grafted polymer is, for example, favorably usable for the following: scale inhibitors; detergent additives; additives agents in textile dyeing process; thickeners, dispersing agents, binders, and moisturizing agents for cosmetics and toiletries; coating agents and binders for paper; dispersants for pigments; and adhesives.

The scale inhibitor according to the present invention comprises the aforementioned grafted polymer according to the present invention as an essential component. This scale inhibitor, according to the present invention, can effectively inhibit the occurrence of scale, because the pyrrolidone group and the oxyethylene chain in the grafted polymer strongly disperses inorganic particles which are sparingly soluble in water, such as calcium carbonate.

The scale inhibitor according to the present invention exhibits an absorbance of usually not lower than 0.25, preferably not lower than 0.3, more preferably not lower than 0.4, most preferably not lower than 0.5, as measured by the below-mentioned scale dispersibility test. In the scale dispersibility test, the larger numerical value of this absorbance means the lower turbidity and the more excellent scale dispersibility. (Scale dispersibility test): An amount of 1 g of talc with a structure of $Mg_3Si_4O_{10}(OH)_2$ is placed into a colorimetric tube (inner diameter: 2.5 cm, capacity: 100 ml) with a cock, and thereto 100 ml of aqueous solution is added wherein the aqueous solution is prepared such that the concentration of the grafted polymer can be 50 ppm (herein, "ppm" is by weight), and that the concentration of Ca can be 200 ppm (in terms of $CaCO_3$, added as $CaCl_2$). Then, the colorimetric tube is shaken up and down 100 times respectively and then allowed to stand stationary for 3 hours. Then, 1 ml of the resultant test liquid is sampled with a whole pipet from a portion as located at a height of 15 cm above the bottom of the colorimetric tube to measure the absorbance of the test liquid with a spectrophotometer under conditions of wavelength=380 nm, cell size=10×10 mm.

The scale inhibitor according to the present invention may further comprise components other than the aforementioned grafted polymer. Specific examples of the above other components include: phosphoric compounds such as polymerized phosphate salts, phosphonate salts, and phosphonocarboxylic acids; salts of metals such as zinc; and fungicides such as chlorine, hypochlorite salts, and hydrazine. These exemplified components may be used either alone respectively or in combinations with each other. In addition, the mixing ratios of these components are not especially limited, but may fitly be set respectively. In other words, it is enough for the scale inhibitor according to the present invention to comprise at least the aforementioned grafted polymer. The content of the grafted polymer in the scale inhibitor is not especially limited, but is preferably in the range of 0.1~100 weight %, more preferably 1~100 weight %

The scale inhibitor according to the present invention can exhibit effects of inhibiting and removing scales such as magnesium silicate, calcium carbonate, calcium phosphate, zinc hydroxide, zinc phosphate, barium sulfate, calcium sulfate, magnesium hydroxide, silica, and iron, and exhibits the dispersibility particularly upon silica scale.

The scale inhibitor according to the present invention may be added intactly to water systems such as cooling water systems, boiler water systems, steel production process water systems, seawater desalination plants, oil feeds, and pulp digestors and black liquor evaporators in the paper production process. In addition, when the scale inhibitor according to the present invention further comprises components other than the grafted polymer according to the present invention, the grafted polymer and each of the other components can be added separately from each other.

When the scale inhibitor according to the present invention is added to the water system, the amount of the scale inhibitor may be such that the concentration of the aforementioned grafted polymer (which the scale inhibitor comprises) in the water system used can fall into the range of usually 0.1~100 ppm, preferably 0.5~50 ppm.

The scale inhibitor according to the present invention can be used jointly with conventional scale inhibitors, of which the examples include: acrylic acid polymers; maleic acid polymers; copolymers of such as acrylic acid with monoethylenically unsaturated sulfonic compounds such as 2-hydroxy-3-allyloxypropanesulfonic acid and 2-acrylamido-2-methylpropanesulfonic acid; and copolymers of such as acrylic acid with monoethylenically unsaturated compounds having a hydroxyl group such as 2-hydroxyethyl methacrylate.

The detergent additive, according to the present invention, comprises the aforementioned grafted polymer according to the present invention as an essential component. The oxyethylene chain and the pyrrolidone group in the grafted polymer adsorbs and disperses dyes as eluted from fibers into water by washing, therefore the detergent additive according to the present invention can effectively inhibit the dyes from migrating to other fibers. A preferred embodiment of the detergent additive according to the present invention is specifically a dye migration inhibitor.

The detergent additive according to the present invention exhibits a dye migration inhibition ratio of usually not lower than 25%, preferably not lower than 30%, more preferably not lower than 40%, as measured by the below-mentioned method. The detergent additive according to the present invention can keep the dye migration inhibition ratio of not lower than 25% and therefore can surely inhibit the dye migration. 99133 (Dye migration inhibition ratio): First, a detergent composition, comprising sodium dodecyl sulfate 20 weight %, polyoxyethylene lauryl ether 15 weight %, sodium polyoxyethylene lauryl sulfate 8 weight %, ethanol 7 weight %, and water 50 weight %, is prepared. Next, 500 ml of washing liquid, containing the above detergent composition 0.1 weight % (surfactant concentration: 430 ppm), Evans Blue (produced by Wako Pure Chemical Industries, Ltd.) 0.4 ppm as a dye, and the grafted polymer 10 ppm, is prepared in a 500-ml beaker with water of the hardness 30° DH containing calcium/magnesium=3/1 (mol). Then, two pieces of cotton cloth 5 cm square (original cloth) are prepared and then immersed into the above washing liquid to wash the cotton cloth by stirring with a magnetic stirrer for 15 minutes. Next, the washing liquid is replaced with the same water as the above to rinse the washed cotton cloth therewith by stirring with a magnetic stirrer for 15 minutes in the same way as the above. The rinsed cotton cloth is dried and then taken as test cloth. On the other hand, a washing liquid is prepared in the same way as the above except that the grafted polymer is not added thereto, and two pieces of cotton cloth are washed with this washing liquid, and then rinsed, and then dried in the same way as the above, and the resultant cotton cloth is taken as blank cloth. Then, the reflectivities of two pieces each of the test cloth, the original cloth, and the blank cloth are measured with a colorimetric color difference meter to take the average of the two pieces respectively as a Y value and to calculate the dye migration inhibition ratio from the resultant Y values in accordance with the following equation:

Dye migration inhibition ratio (%)=(Y value of test cloth−Y value of blank cloth)/(Y value of original cloth−Y value of blank cloth)×100

The detergent additive according to the present invention is added to such as powdery or liquid detergents and softening agents for home use and washing agents and fiber-treating agents for industrial use to exhibit the dye migration inhibition effects. The amount of the detergent additive, as added in this case, is not especially limited, but may be in the range of 0.05~20 weight %, preferably 0.1~10 weight %, of such as powdery or liquid detergents and softening agents for home use and washing agents and fiber-treating agents for industrial use. Especially, in the case where the detergent additive is added to the detergent, the amount of the detergent additive may be such that the grafted polymer can be in the range of 0.1~5 weight % of the surfactant. In addition, the composition or form of the detergent to which the detergent additive according to the present invention is added is not especially limited. For example, as to the composition of the detergent, the detergent additive according to the present invention is applicable to detergents comprising anionic surfactants, nonionic surfactants, or mixtures thereof, and further, the form of the detergent may be either powdery or liquid.

In addition, such as powdery or liquid detergents and softening agents for home use and washing agents and fiber-treating agents for industrial use, to which the detergent additive according to the present invention is added, may contain such as acrylic acid polymers or acrylic acid/maleic acid copolymers, which are conventionally widely used as detergent additives.

Effects and Advantages of the Invention

The present invention can provide a novel grafted polymer which has good hydrophilicity and is excellent in the adsorbency and the dispersibility.

Furthermore, the present invention can provide: a scale inhibitor which exhibits excellent dispersibility; and a detergent additive which exhibits excellent dye migration inhibitability.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

The grafted polymers, the comparative grafted polymers, and the comparative polymers, which were obtained in the below-mentioned examples and comparative examples, were subjected to the scale dispersibility test (when used as the scale inhibitor) and the evaluation of the dye migration inhibition ratio (when used as the detergent additive) by the following methods.

Scale dispersibility test

The dispersibility of talc with a structure of $Mg_3Si_4O_{10}(OH)_2$, which is a typical composition of silica scale in cooling water systems, was evaluated in the following way:

An amount of 1 g of the above talc (produced by Wako Pure Chemical Industries, Ltd.) was placed into a colorimetric tube (inner diameter: 2.5 cm, capacity: 100 ml) with a cock, and thereto 100 ml of aqueous solution was added wherein the aqueous solution was prepared such that the concentration of the grafted polymer could be 50 ppm, and that the concentration of Ca could be 200 ppm (in terms of $CaCO_3$, added as $CaCl_2$). Then, the colorimetric tube was shaken up and down 100 times respectively and then allowed to stand stationary for 3 hours. Then, 1 ml of the resultant test liquid was sampled with a whole pipet from a portion as located at a height of 15 cm above the bottom of the colorimetric tube. The turbidity of this test liquid was evaluated by measuring the absorbance of the test liquid with a spectrophotometer (UV-1200, produced by Shimadzu Corporation) under conditions of wavelength=380 nm, cell size=10×10 mm. The larger numerical value of this absorbance means the more excellent scale dispersibility.

Dye Migration Inhibition Ratio

First, a detergent composition, comprising sodium dodecyl sulfate 20 weight %, polyoxyethylene lauryl ether 15 weight %, sodium polyoxyethylene lauryl sulfate 8 weight %, ethanol 7 weight %, and water 50 weight %, was prepared.

Next, 500 ml of washing liquid, containing the above detergent composition 0.1 weight % (surfactant concentration: 430 ppm), Evans Blue (produced by Wako Pure Chemical Industries, Ltd.) 0.4 ppm as a dye, and the grafted polymer 10 ppm, was prepared in a 500-ml beaker with water of the hardness 3° DH containing calcium/magnesium=3/1 (mol). Then, two pieces of cotton cloth 5 cm square (original cloth) was prepared and then immersed into the above washing liquid to wash the cotton cloth by stirring with a magnetic stirrer for 15 minutes. Next, the washing liquid was replaced with the same water as the above to rinse the washed cotton cloth therewith by stirring with a magnetic stirrer for 15 minutes in the same way as the above. The rinsed cotton cloth was dried and then taken as test cloth. On the other hand, a washing liquid was prepared in the same way as the above except that the grafted polymer was not added thereto, and two pieces of cotton cloth was washed with this washing liquid, and then rinsed, and then dried in the same way as the above, and the resultant cotton cloth was taken as blank cloth. Then, the reflectivities of two pieces each of the test cloth, the original cloth, and the blank cloth were measured with a colorimetric color difference meter (ND-1001DP model, produced by Nippon Denshoku Kogyo Co., Ltd.) to take the average of the two pieces respectively as a Y value and to calculate the dye migration inhibition ratio from the resultant Y values in accordance with the following equation:

Dye migration inhibition ratio (%)=(Y value of test cloth–Y value of blank cloth)/(Y value of original cloth–Y value of blank cloth)×100

EXAMPLE 1

An amount of 150 weight parts of polyethylene glycol having a number-average molecular weight of 10,000 was charged into a glass reactor with a thermometer, a stirrer, a nitrogen-introducing tube, and a reflux condenser, and then melted by heating under a nitrogen gas stream, and then further heated to 149° C. under stirring. Next, while the temperature was maintained in the range of 149~150° C., 50 weight parts of N-vinylpyrrolidone and 2.5 weight parts of di-tert-butyl peroxide (trade name: "Perbutyl D", produced by NOF CORPORATION) were dropwise added separately from each other into the reactor continuously over a period of 1 hour. Thereafter, the stirring was continued for another 1 hour to obtain a grafted polymer 1.

The scale dispersibility test of the resultant grafted polymer 1 was carried out, with the result that the absorbance was 0.32. In addition, the dye migration inhibition ratio was 33%.

EXAMPLE 2

An amount of 150 weight parts of polyethylene glycol having a number-average molecular weight of 10,000 was melted in the same way as of Example 1, and then further heated to 148° C. under stirring. Next, while the temperature was maintained in the range of 148~152° C., 1.9 weight parts of di-tert-butyl peroxide (trade name: "Perbutyl D", produced by NOF CORPORATION) and a mixture of 34 weight parts of N-vinylpyrrolidone and 3 weight parts of N-vinylimidazole were dropwise added separately from each other into the reactor continuously over a period of 45 minutes. Thereafter, the stirring was continued for another 30 minutes to obtain a grafted polymer 2.

The scale dispersibility test of the resultant grafted polymer 2 was carried out, with the result that the absorbance was 0.47. In addition, the dye migration inhibition ratio was 54%.

EXAMPLE 3

An amount of 150 weight parts of polyethylene glycol having a number-average molecular weight of 10,000 was melted in the same way as of Example 1, and then further heated to 140° C. under stirring. Next, while the temperature was maintained in the range of 140~141° C., 2.5 weight parts of di-tert-butyl peroxide (trade name: "Perbutyl D", produced by NOF CORPORATION) and a mixture of 30 weight parts of N-vinylpyrrolidone and 20 weight parts of n-butyl acrylate were dropwise added separately from each other into the reactor continuously over a period of 1 hour. Thereafter, the stirring was continued for another 1 hour. Then, 200 weight parts of water was added into the reactor to form an aqueous solution, to which 11.8 weight parts of 48 weight % aqueous sodium hydroxide solution was added to carry out hydrolysis. Next, the reflux condenser was taken off, and then the resultant aqueous solution was heated at 100° C. to remove n-butanol resultant from the hydrolysis, thus obtaining a grafted polymer 3. From the acid value of the resultant grafted polymer 3, it was inferred that this grafted polymer 3 was such that 90 mol % of all structural units as derived from the n-butyl acrylate were in carboxylic acid (or salt) form as a result of the hydrolysis.

The scale dispersibility test of the resultant grafted polymer 3 was carried out, with the result that the absorbance was 0.50.

COMPARATIVE EXAMPLE 1

An amount of 150 weight parts of polyethylene glycol having a number-average molecular weight of 10,000 was melted in the same way as of Example 1, and then further heated to 148° C. under stirring. Next, while the temperature was maintained in the range of 148~152° C., 10 weight parts of N-vinylpyrrolidone and 0.5 weight parts of di-tert-butyl peroxide (trade name: "Perbutyl D", produced by NOF CORPORATION) were dropwise added separately from each other into the reactor continuously over a period of 30 minutes. Thereafter, the stirring was continued for another 30 minutes to obtain a comparative grafted polymer 1.

The scale dispersibility test of the resultant comparative grafted polymer 1 was carried out, with the result that the absorbance was 0.15. In addition, the dye migration inhibition ratio was 10%.

COMPARATIVE EXAMPLE 2

An amount of 50 weight parts of polyethylene glycol having a number-average molecular weight of 10,000 was melted in the same way as of Example 1, and then further heated to 140° C. under stirring. Next, while the temperature was maintained in the range of 140~142° C., 4 weight parts of di-tert-butyl peroxide (trade name: "Perbutyl D", produced by NOF CORPORATION) and a mixture of 25 weight parts of N-vinylpyrrolidone and 50 weight parts of n-butyl acrylate were dropwise added separately from each other into the reactor continuously over a period of 60 minutes. Thereafter, the stirring was continued for another 30 minutes to obtain a comparative grafted polymer 2.

The scale dispersibility test of the resultant comparative grafted polymer 2 was carried out, with the result that the absorbance was 0.14. In addition, the dye migration inhibition ratio was 19%.

COMPARATIVE EXAMPLE 3

An amount of 150 weight parts of polyethylene glycol having a number-average molecular weight of 10,000 was melted in the same way as of Example 3, and then further heated to 140° C. under stirring. Next, while the temperature was maintained in the range of 140~141° C., 2.5 weight parts of di-tert-butyl peroxide (trade name: "Perbutyl D", produced by NOF CORPORATION) and a mixture of 30 weight parts of N-vinylpyrrolidone and 20 weight parts of n-butyl acrylate were dropwise added separately from each other into the reactor continuously over a period of 60 minutes. Thereafter, the stirring was continued for another 60 minutes to obtain a comparative grafted polymer 3 without hydrolysis.

The scale dispersibility test of the resultant comparative grafted polymer 3 was carried out, with the result that the absorbance was 0.17.

Comparative polymers

An acrylic acid/maleic acid copolymer (molar ratio=7/3) having a number-average molecular weight of 60,000 was taken as a comparative polymer, and its scale dispersibility test was carried out, with the result that the absorbance was 0.19. In addition, the dye migration inhibition ratio was measured, with the result that it was 3%.

A poly(acrylic acid) having a number-average molecular weight of 5,000 was taken as a comparative polymer, and its dye migration inhibition ratio was measured, with the result that it was −3%.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A scale inhibitor comprising a grafted polymer, which is a product by a process including the step of graft-polymerizing a graft component (B) onto a polyether compound (A) in a ratio such that the graft component (B) is in the range of 0.1~1.2 weight parts per 1 weight part of the polyether compound (A), wherein the polyether compound (A) is a product by a process including the step of polymerizing an alkylene oxide component with an ethylene oxide content of at least 50 mol % and has a number-average molecular weight of not lower than 200, and wherein the graft component (B) includes N-vinylpyrrolidone (b1) and a monoethylenically unsaturated monomer (b2) as essential components, wherein the monomer (b2) includes a carboxyl-group-containing monoethylenically unsaturated monomer (b2-1) as an essential component and optionally a cationic monoethylenically unsaturated monomer (b2-2), wherein said carboxy-group-containing monoethylenically unsaturated monomer (b2-1) includes at least one selected from the group consisting of acrylic acid and esters thereof, maleic acid and maleic anhydride where the monomer (b2-1) is optionally a monomer having a structure formable into a carboxylic acid (or its salt) by hydrolysis, wherein when the monomer (b2-1) includes the monomer having the structure formable into a carboxylic acid (or salt) by hydrolysis, not less than 50 mol % of all structural units as derived from the monomer (b2-1) have a carboxyl group, inclusive of a carboxyl group formable by the hydrolysis of the monomer having the above structure, with the proviso that when the carboxylic salt is formed by the hydrolysis, this carboxylic salt is also taken as the carboxyl group.

2. A scale inhibitor comprising said grafted polymer according to claim 1, wherein the weight ratio between the N-vinylpyrrolidone (b1) and the monoethylenically unsaturated monomer (b2) is such that the monoethylenically unsaturated monomer (b2) is in the range of not more than 5 weight parts per 1 weight part of the N-vinylpyrrolidone (b1).

3. A scale inhibitor comprising a grafted polymer, which is a product by a process including the step of graft-polymerizing a graft component (B) onto a polyether compound (A) in a ratio such that the graft component (B) is in the range of 0.1~1.2 weight parts per 1 weight part of the polyether compound (A), wherein the polyether compound (A) is a product by a process including the step of polymerizing an alkylene oxide component with an ethylene oxide content of at least 50 mol % and has a number-average molecular weight of not lower than 200, and wherein the graft component (B) includes N-vinylpyrrolidone (b1) as an essential component and optionally a monoethylenically unsaturated monomer (b2), wherein the monomer (b2) is selected from the group consisting of a carboxyl-group-containing monoethylenically unsaturated monomer (b2-1), a cationic monoethylenically unsaturated monomer (b2-2), and mixtures thereof, where the monomer (b2-1) is optionally a monomer having a structure formable into a carboxylic acid (or its salt) by hydrolysis, wherein when the monomer (b2-1) includes the monomer having the structure formable into a carboxylic acid (or salt) by hydrolysis, not less than 50 mol % of all structural units as derived from the monomer (b2-1) have a carboxyl group, inclusive of a carboxyl group formable by the hydrolysis of the monomer having the above structure, with the proviso that when the carboxylic salt is formed by the hydrolysis, its carboxylic salt is also taken as the carboxyl group.

4. A scale inhibitor comprising a grafted polymer, which is a product by a process including the step of graft-polymerizing a graft component (B) onto a polyether compound (A) in a ratio such that the graft component (B) is in the range of 0.1~1.2 weight parts per 1 weight part of the polyether compound (A), wherein the polyether compound (A) is a product by a process including the step of polymerizing an alkylene oxide component with an ethylene oxide content of at least 50 mol % and has a number-average molecular weight of not lower than 200, and wherein the graft component (B) includes N-vinylpyrrolidone (b1) as an essential component.

5. The scale inhibitor of claim 4, wherein said graft component (B) further comprises a monoethylenically unsaturated monomer (b2), wherein said monomer (b2) is selected from the group consisting of a carboxyl-group-containing monoethylenically unsaturated monomer (b2-1), a cationic monoethylenically unsaturated monomer (b2-2), and mixtures thereof.

6. The scale inhibitor of claim 5, wherein said monomer (b2-1) has a structure formable into a carboxylic acid (or salt) by hydrolysis, wherein when the monomer (b2-1) includes the monomer having the structure formable into said carboxylic acid (or salt) by hydrolysis, not less than 50 mol % of all structural units as derived from the monomer (b2-1) have a carboxyl group, inclusive of a carboxyl group formable by the hydrolysis of the monomer having the above structure, with the proviso that when the carboxylic salt is formed by the hydrolysis, its carboxylic salt is also taken as the carboxyl group.

7. The scale inhibitor of claim 5, wherein monoethylenically unsaturated monomer (b2) is at least one member selected from the group consisting of: acrylic acid; methacrylic acid; maleic acid; fumaric acid; esters of these acids; maleic anhydride; N-vinylimidazole, and vinylpyridine.

* * * * *